US 12,516,747 B2

(12) United States Patent
Williams et al.

(10) Patent No.: US 12,516,747 B2
(45) Date of Patent: *Jan. 6, 2026

(54) VALVE ASSEMBLY WITH SERVICE STOP WITH MULTIPLE TOOL INTERFACES

(71) Applicant: Kohler Co., Kohler, WI (US)

(72) Inventors: Steven D. Williams, Plymouth, WI (US); Chad J. Cochart, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,735

(22) Filed: Apr. 23, 2024

(65) Prior Publication Data

US 2024/0271718 A1 Aug. 15, 2024

Related U.S. Application Data

(63) Continuation of application No. 17/241,787, filed on Apr. 27, 2021, now Pat. No. 11,982,372.

(60) Provisional application No. 63/017,394, filed on Apr. 29, 2020.

(51) Int. Cl.
*F16K 31/60* (2006.01)
*F16K 31/44* (2006.01)

(52) U.S. Cl.
CPC .............. *F16K 31/60* (2013.01); *F16K 31/44* (2013.01)

(58) Field of Classification Search
CPC .......... F16K 31/44; F16K 31/60; F16B 23/00; F16B 23/0038
USPC .............................. 251/90, 101, 231, 291, 29
See application file for complete search history.

(56) References Cited

U.S. PATENT DOCUMENTS

| | | |
|---|---|---|
| 586,434 A | 7/1897 | Greene |
| 789,795 A | 5/1905 | Chenery |
| 876,483 A | 1/1908 | Myers |
| 1,128,982 A | 2/1915 | Hogle |
| 2,004,860 A | 6/1935 | Gerrari et al. |
| 2,076,041 A * | 4/1937 | Payne ................. F16B 25/0021 470/182 |
| 2,098,515 A * | 11/1937 | Pardieck ................. F16K 31/60 403/384 |
| 3,190,306 A | 6/1965 | Staat |
| 3,460,800 A * | 8/1969 | Antons .................... F16K 1/221 251/285 |
| 3,586,031 A | 6/1971 | Muller et al. |
| 3,916,939 A | 11/1975 | Gillard |
| 4,257,575 A | 3/1981 | Runyan |
| 4,577,830 A | 3/1986 | Winegeart |
| 4,662,775 A | 5/1987 | Faul |
| 4,971,097 A | 11/1990 | Hunley et al. |

(Continued)

FOREIGN PATENT DOCUMENTS

KR 101921149 B1 * 11/2018 ............. F16B 31/02

OTHER PUBLICATIONS

AliExpress Website (Year: 2017).*
Translation of KR-101921149 (Year: 2018).*

*Primary Examiner* — Umashankar Venkatesan
(74) *Attorney, Agent, or Firm* — Foley & Lardner LLP

(57) ABSTRACT

A valve assembly includes a first tool interface that can receive a nut driver and transfer a first torque from the nut driver to rotate a service stop. The valve assembly includes a second tool interface that can receive a screwdriver and transfer a second torque from the screwdriver to rotate the service stop.

20 Claims, 6 Drawing Sheets

(56) References Cited

U.S. PATENT DOCUMENTS

| | | |
|---|---|---|
| 5,076,319 A | 12/1991 | Salley |
| 5,908,044 A | 6/1999 | Kearns et al. |
| 6,871,576 B2 | 3/2005 | Vari |
| 11,982,372 B2 * | 5/2024 | Williams .............. F16K 43/001 |

* cited by examiner

VALVE ASSEMBLY WITH SERVICE STOP WITH MULTIPLE TOOL INTERFACES

CROSS-REFERENCE TO RELATED PATENT APPLICATIONS

This application is a continuation of U.S. patent application Ser. No. 17/241,787, filed Apr. 27, 2021, which claims the benefit of and priority to U.S. Provisional Patent Application No. 63/017,394, filed Apr. 29, 2020, both of which are incorporated herein by reference in their entireties.

BACKGROUND

The present disclosure relates generally to valve assemblies. More specifically, the present disclosure relates to service stops used to control the flow rate of fluid though a valve assembly.

SUMMARY

At least one embodiment relates to a valve assembly. The valve assembly includes an inlet to receive a fluid into the valve assembly, an outlet to discharge the fluid from the valve assembly and a service stop. The service stop can be coupled to the inlet or the outlet. The service stop can rotate relative to the inlet or the outlet to control a flow of the fluid through the inlet or the outlet. The service stop can include a first tool interface and a second tool interface. The first tool interface can receive a first hand tool and transfer a first torque from the first hand tool to the service stop to facilitate rotating the service stop using the first hand tool. The second tool interface can receive a second hand tool different from the first hand tool and configured to transfer a second torque from the second hand tool to the service stop to facilitate rotating the service stop using the second hand tool.

At least one embodiment relates to a valve assembly. The valve assembly includes an inlet to receive a fluid into the valve assembly, an outlet to discharge the fluid from the valve assembly, and a service stop. The service stop can rotate relative to the inlet or the outlet to inhibit a flow of the fluid through the inlet or the outlet. The service stop can include a plurality of tool interfaces. The plurality of tool interfaces can receive a plurality of different hand tools such that the service stop can be rotated using any of the plurality of different hand tools.

At least one embodiment relates to a valve assembly. The valve assembly includes a body and a service stop. The service stop can be coupled to the inlet or the outlet. The service stop can rotate relative to the inlet or the outlet to inhibit a flow of the fluid through the inlet or the outlet. The service stop can include a first tool interface and a second tool interface. The first tool interface can receive a first hand tool and transfer a first torque from the first hand tool to the service stop to facilitate rotating the service stop using the first hand tool. The second tool interface can receive a second hand tool different from the first hand tool and configured to transfer a second torque from the second hand tool to the service stop to facilitate rotating the service stop using the second hand tool.

DETAILED DESCRIPTION

Figure 1:
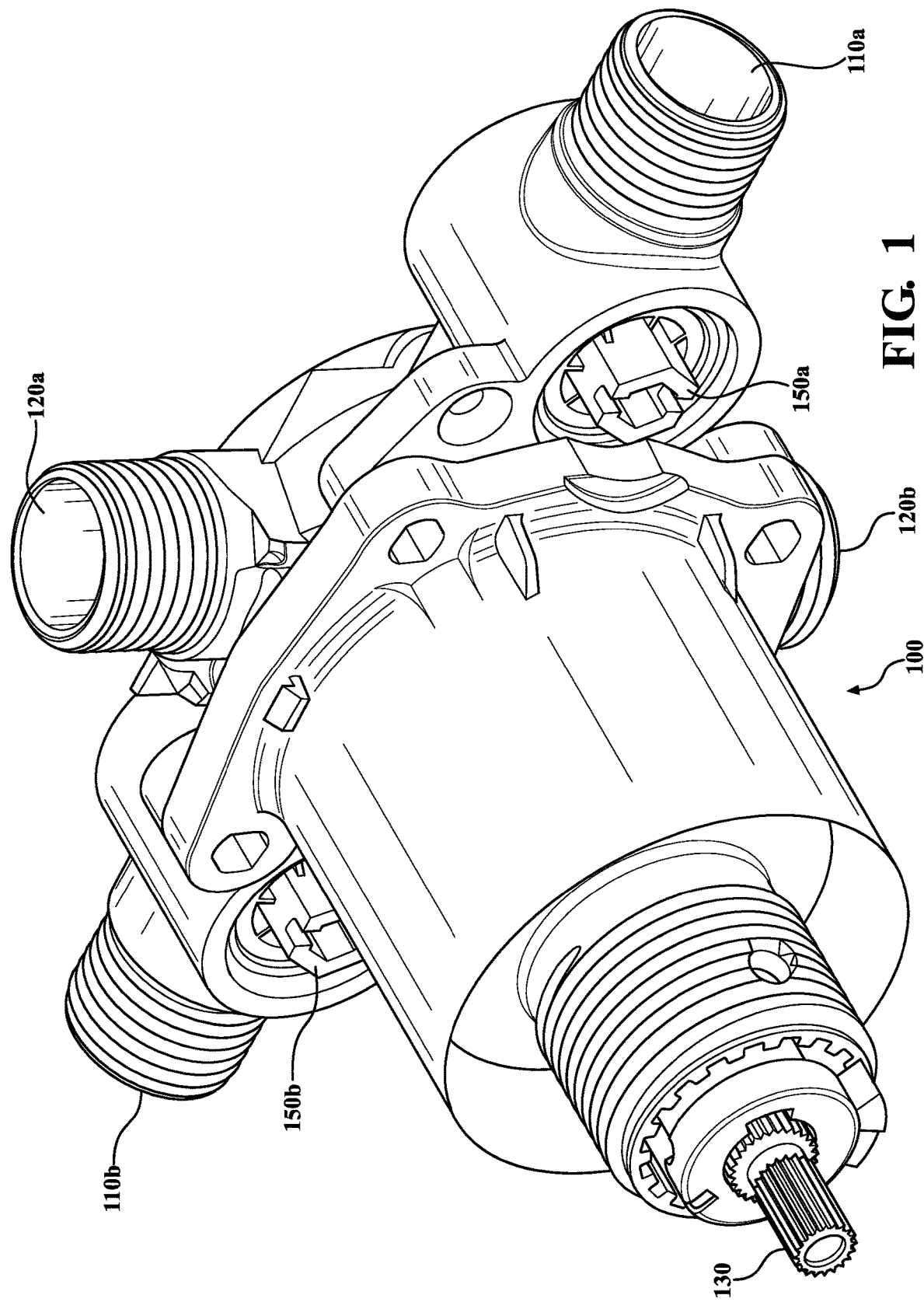
FIG. 1 is a perspective view of a valve assembly, according to an exemplary embodiment.

Before turning to the figures, which illustrate certain exemplary embodiments in detail, it should be understood that the present disclosure is not limited to the details or methodology set forth in the description or illustrated figures. It should also be understood that the terminology is used herein for the purpose of description only and should not be regarded as limiting.

The following description focuses primarily on service stops used in plumbing fixtures, but it should also be appreciated that the service stop described herein can also be used in various fluid systems, such as gas and oil circuits, hydraulic circuits, and any other valve assembly.

In a conventional fluidic valve assembly, such as for use in a bathroom shower system or a sink faucet system, there is typically a service stop that can be used to close the valve assembly in order to stop the flow of fluid into the system. For example, a service stop can be installed upstream of a sink faucet such that the service stop can stop the flow of water in the supply line to the sink faucet. It can be advantageous to install a service stop for several reasons, including for maintenance and replacement purposes. For example, if there is a desire to repair or replace a sink faucet, the water supply should first be turned off to prevent water damage to the surrounding area. One way to turn off the water supply to the sink faucet is to shut off the water supply to the entire building. However, this is not always a practical solution, especially in large buildings such as a hotel or office building. Alternatively, if there is a service stop installed just upstream of the bathroom sink, then the service stop can be turned, shutting off the water supply to the bathroom sink that is being replaced or repaired, without shutting off the water supplied to the entire building.

Generally speaking, there are two common types of service stops used in valve assemblies for systems such as shower or bathing systems. The first type of service stop is designed to be turned by hand using a handle. However, the handle must be large enough so that a person turning the handle by hand is able to apply sufficient torque to close the service stop. The second type of service stop has a slot that is designed to receive a flathead screwdriver so that the service stop can be turned using a flathead screwdriver. By omitting a large handle, a service stop that is designed to be turned using a flathead screwdriver can be much more compact, thus saving space. However, this type of service stop requires a person to have the properly sized flathead screwdriver to turn the service stop. Further, if the slot in the service stop becomes damaged or filled with debris (e.g. plaster, mortar, caulk, etc.), the service stop may be difficult or impossible to turn. Therefore, it would be advantageous to have a service stop that is designed to be turned using a variety of tools.

Referring generally to the figures, disclosed herein is a valve assembly with a service stop for use in fluid supplying environments (e.g., kitchen, shower, bathing, or various other systems) that can be turned using a plurality of different types of hand tools to control the flow of fluid into the valve assembly. According to an exemplary embodiment, the service stop has a plurality of tool interfaces that are configured to receive at least two different types of hand tools. In this manner, the disclosed valve assembly can provide greater flexibility to a user or technician that may be servicing or repairing the valve assembly.

Referring to FIG. 1, a valve assembly 100 is shown according to an exemplary embodiment. The valve assembly 100, according to the exemplary embodiment shown in FIG. 1, includes a first fluid inlet 110a configured to receive water from a water supply, such as a household water supply, and a second fluid inlet 110b configured to receive a fluid from the water supply. The valve assembly 100 also includes a first fluid outlet 120a configured to deliver water to a first water delivery device (e.g., a showerhead, a hand sprayer, etc.) and a second fluid outlet 120b configured to deliver water to a second water delivery device (e.g., a tub spout, etc.). While this example embodiment includes a plurality of inlets and outlets, other example embodiments may include a singular inlet, a singular outlet, a singular inlet and a plurality of outlets, a singular outlet and a plurality of inlets, and/or a combination of a plurality of inlets and outlets. For example, the valve assembly 100 may include one inlet and one outlet, according to an exemplary embodiment. The valve assembly 100 may include one inlet and two outlets, according to another exemplary embodiment. The valve assembly 100 may include two inlets and one outlet, according to yet another exemplary embodiment.

Further, the valve assembly 100, according to this exemplary embodiment, includes a valve cartridge 130 (e.g., mixing valve, fluidic valve, etc.) that is configured to control the fluid flow rate into the first fluid inlet 110a and the second fluid inlet 110b, and also configured to control the fluid flow rate out of the first fluid outlet 120a and the second fluid outlet 120b. The valve cartridge 130 can control the fluid flow rates at the various inlets and outlets in a vast number of ways, as will be known by one of ordinary skill in the art, including, but not limited to, the use of thermostatic valves, stop valves, overboard valves, globe valves, needle valves, shut-off valves, pressure gauge valves, diaphragm valves, gate valves, plug valves, ball valves, butterfly valves, and pinch valves, or any combination of the above listed valves.

Still referring to FIG. 1, the valve assembly 100 also includes a first service stop 150a and a second service stop 150b adjustably coupled to the first fluid inlet 110a and the second fluid inlet 110b, respectively. The first service stop 150a, according to this exemplary embodiment, is configured to alter the fluid flow rate into the valve assembly 100 through the first fluid inlet 110a in response to the first service stop 150a being rotated or turned, as will be explained in more detail throughout the description. Similarly, the second service stop 150b, according to this exemplary embodiment, is configured to alter the fluid flow rate into the valve assembly 100 through the second fluid inlet 110b in response to the second service stop 150b being rotated, as will be explained in more detail throughout the description. The first service stop 150a and the second service stop 150b can control the fluid flow rate in a vast number of ways, as will be known by one of ordinary skill in the art. For example, the first service stop 150a and second service stop 150b may be coupled to any type of valve mechanism, or any combination of valve mechanisms, including, but not limited to, thermostatic valves, stop valves, overboard valves, globe valves, needle valves, shut-off valves, pressure gauge valves, diaphragm valves, gate valves, plug valves, ball valves, butterfly valves, and pinch valves, such that turning the service stop 150 would adjust the valve mechanism that the service stop 150 is coupled to, so as to control the flow of fluid through the first fluid inlet 110a and the second fluid inlet 110b.

Figure 2:
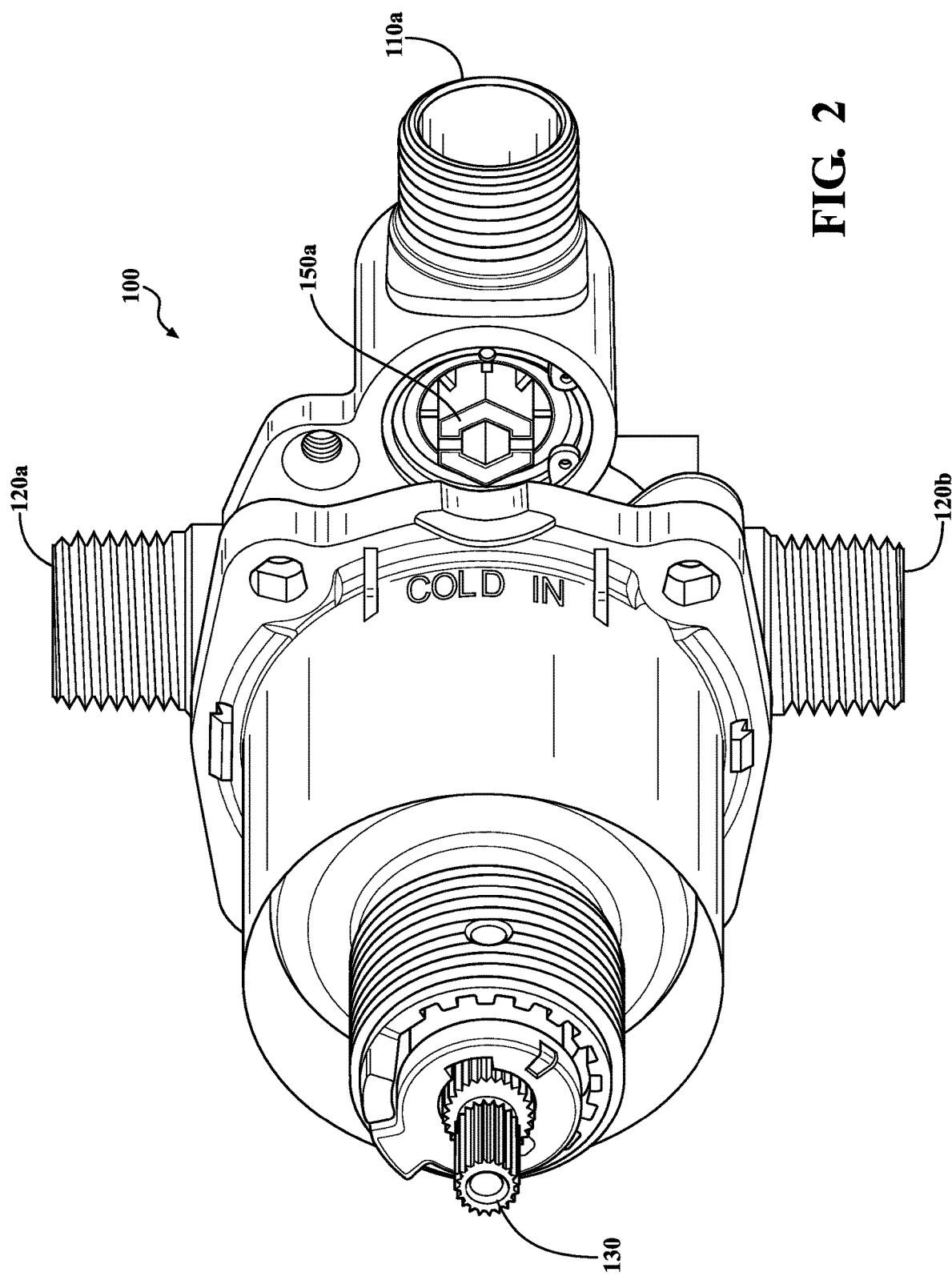
FIG. 2 is another perspective view of the valve assembly of FIG. 1, according to an exemplary embodiment.
Figure 3:
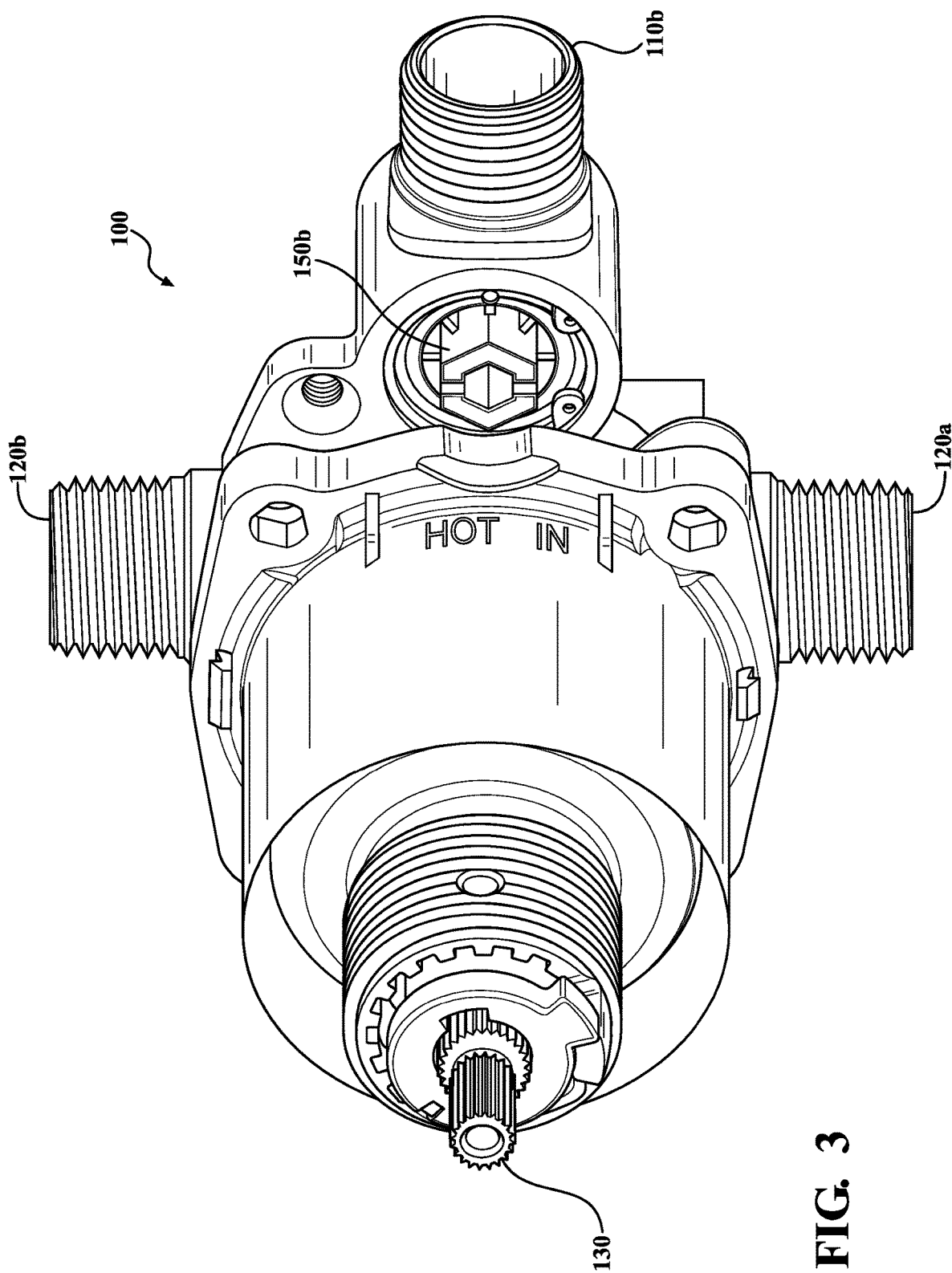
FIG. 3 is another perspective view of the valve assembly of FIG. 1, according to an exemplary embodiment.

Referring now to FIGS. 2-3, the valve assembly 100, according to an exemplary embodiment, is shown from two different perspectives. In this exemplary embodiment, the valve assembly 100 is a shower valve assembly. In this example embodiment, the first fluid inlet 110a is configured to receive cold water from a cold water supply (e.g., household or building water supply, etc.), and the second fluid inlet 110b is configured to receive hot water from a hot water supply (e.g., household or building water supply, etc.). The hot water and cold water are then mixed within the valve assembly 100 by the valve cartridge 130. The resulting mixture of water may then be directed out of the first fluid outlet 120a and the second fluid outlet 120b. The ratio of hot water to cold water may be controlled using the valve cartridge 130. Further, the fluid flow rate out of the first fluid outlet 120a and the second fluid outlet 120b can also be controlled using the valve cartridge 130.

While the valve cartridge 130 may be used to control the fluid flow rate out of the valve assembly 100, it is also advantageous to be able to control the fluid flow rate into the valve assembly 100 using the first service stop 150a and the second service stop 150b. For example, the valve cartridge 130 may leak and one may wish to replace the valve cartridge 130. To replace the valve cartridge 130, it may be necessary to stop fluid from entering the valve assembly 100. This can be accomplished by shutting off the water supply at a central location, which would shut off water to the entire building, or this can be accomplished by turning the first service stop 150a and the second service stop 150b to close the corresponding valve mechanism at each service stop. Closing the valve mechanism located at the first service stop 150a and the second service stop 150b may be particularly advantageous in situations where shutting down the water supply to the entire building is not a feasible solution, such as in a hotel building, office building, or school.

Figure 4:
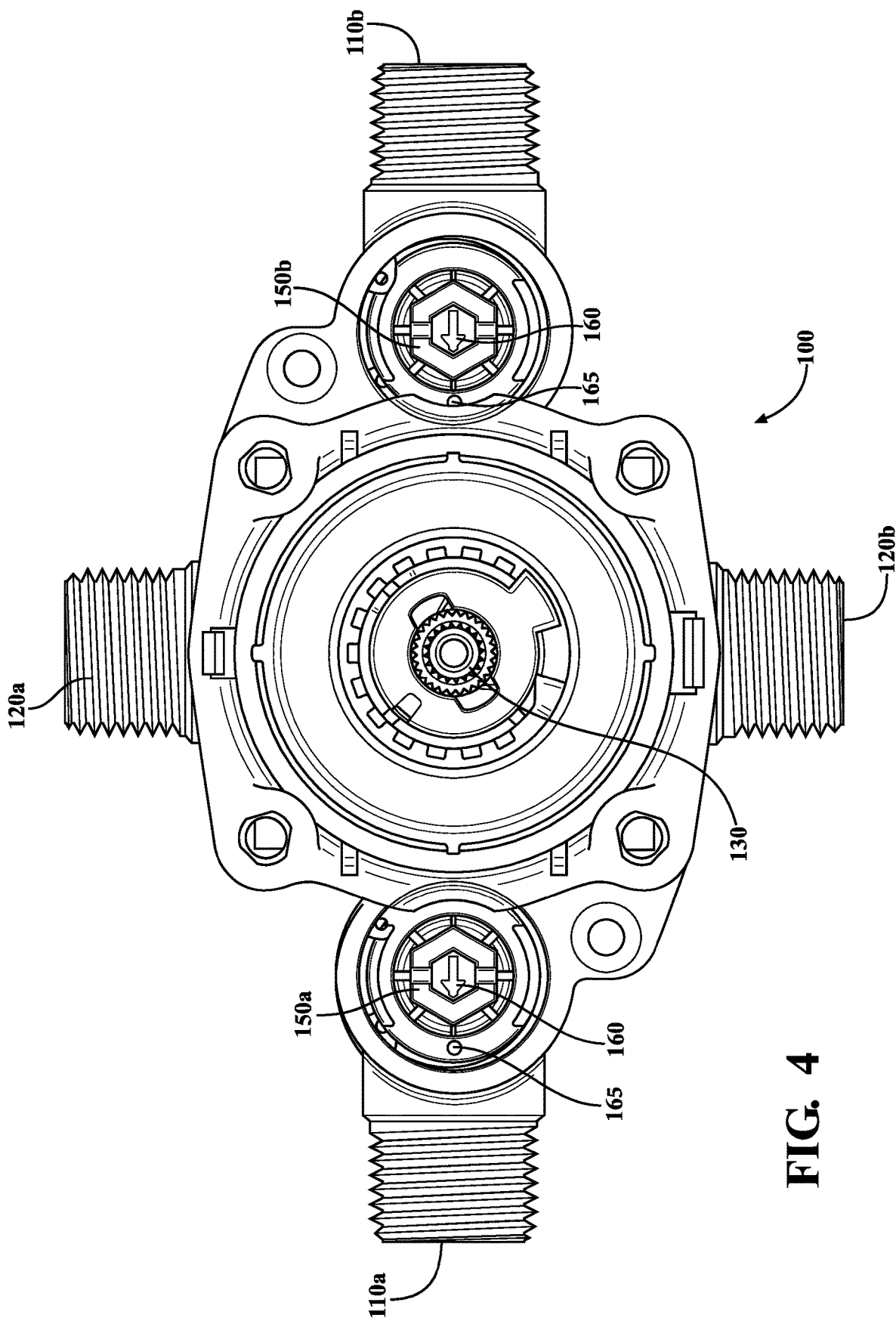
FIG. 4 is a front view of the valve assembly of FIG. 1, according to an exemplary embodiment.

Referring now to FIG. 4, a front view of the valve assembly 100 is shown according to an exemplary embodiment. In this embodiment, the first service stop 150a and second service stop 150b are shown from a user's point of view. As shown in this example embodiment, each service stop 150 has a position indicator 160 that is observable to a user. The position indicator 160 in this example embodiment is shaped like an arrow, however, any distinct marking may be used as a position indicator 160. For example, the position indicator 160 may be circular marking 165. The position indicator 160 may be a protruding guide pin feature, as another example. This position indicator 160 can indicate the rotational position of the valve mechanism coupled to the service stop 150. For example, in the arrow embodiment, when the tip of the arrow on the position indicator 160 is pointing towards the center of the valve cartridge 130, the valve mechanism coupled to the service stop 150 may be in the open position. For example, the arrow of the service stop 150a may indicate that the service stop 150a is in a rotational position that prevents fluid from flowing into the valve assembly 100 through the inlet 110a, as shown in FIG. 4. As another example, the arrow of the service stop 150b may indicate that the service stop 150b is in a rotational position that allows fluid to flow into the valve assembly 100 through the inlet 110b, as shown in FIG. 4.

Figure 7:
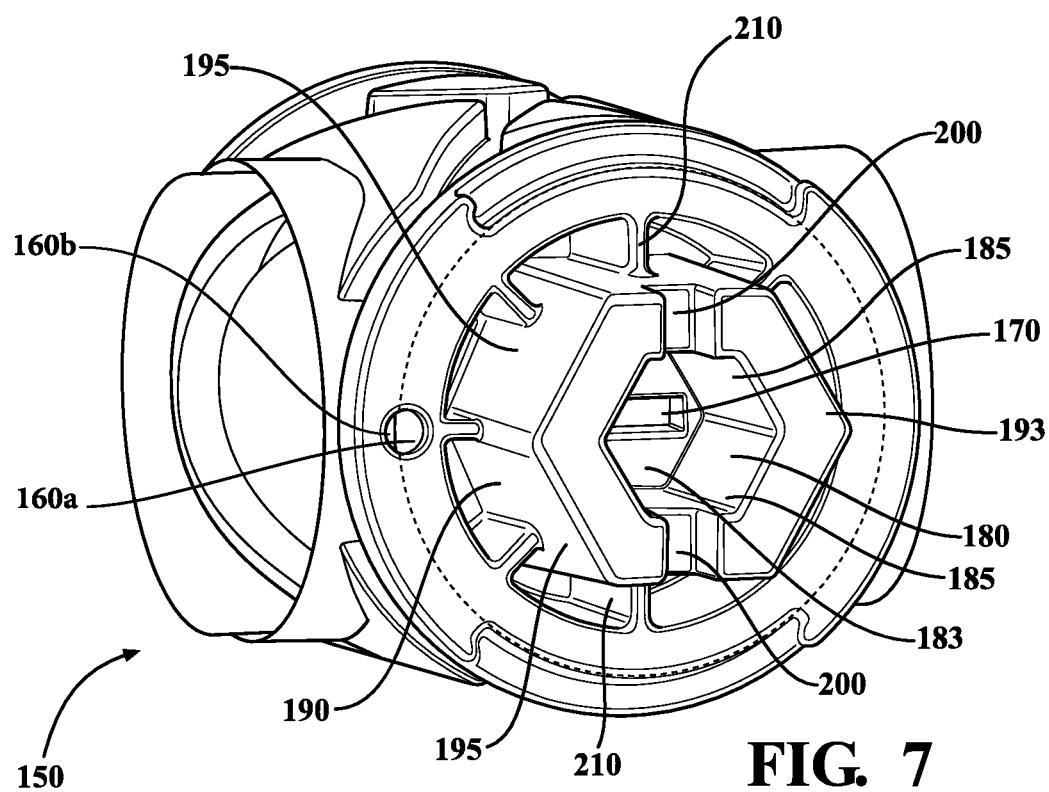
FIG. 7 is a perspective view of the service stop of FIG. 5, according to an exemplary embodiment.

The position indicator 160 may be particularly useful when the valve cartridge 130 is being replaced, making it apparent to the user that the valve mechanism coupled to the service stop 150 is closed to ensure that there is substantially no fluid flowing through the fluid inlet 110. In some embodiments, the position indicator 160 is located along the bottom surface 183 of the hexagonal shaped cavity. In other embodiments, the position indicator 160 includes a first portion 160a located along the service stop 150 and configured to rotate along with the service stop and a second portion 160b located along a non-rotating perimeter of the valve assembly 100 within which the service stop 150 is contained, as shown in FIG. 7. The dotted line shown in FIG. 7 is the boundary between the rotatable service stop 150 and the non-rotating perimeter. The two portions 160a and 160b of the position indicator 160 may be aligned when the service stop 150 is located in a rotational position that permits fluid flow, and may be misaligned when the service stop 150 is in a rotational position that prevents fluid flow.

Figure 5:
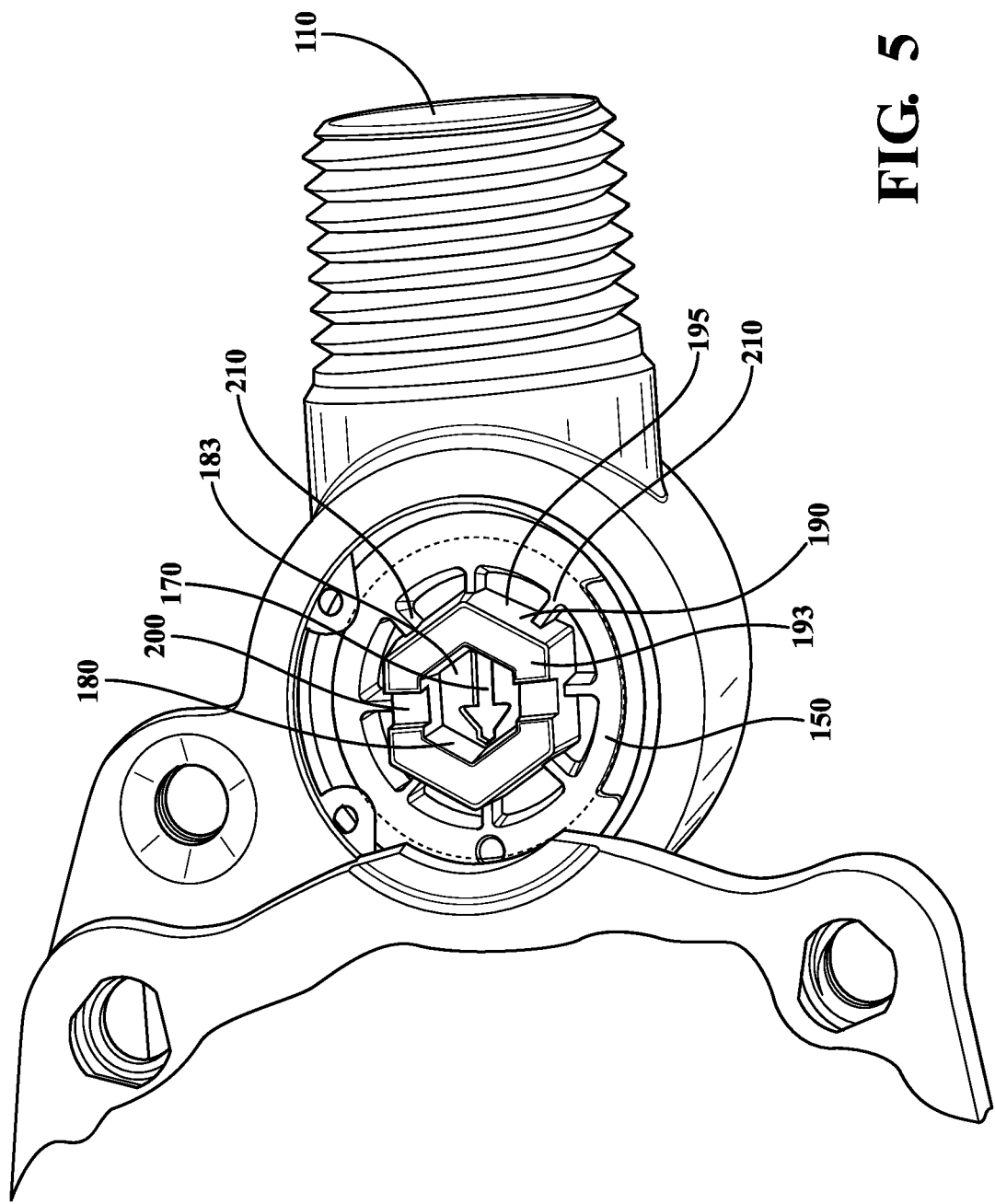
FIG. 5 is a partial front view of the valve assembly of FIG. 1 including a service stop, according to an exemplary embodiment.
Figure 6:
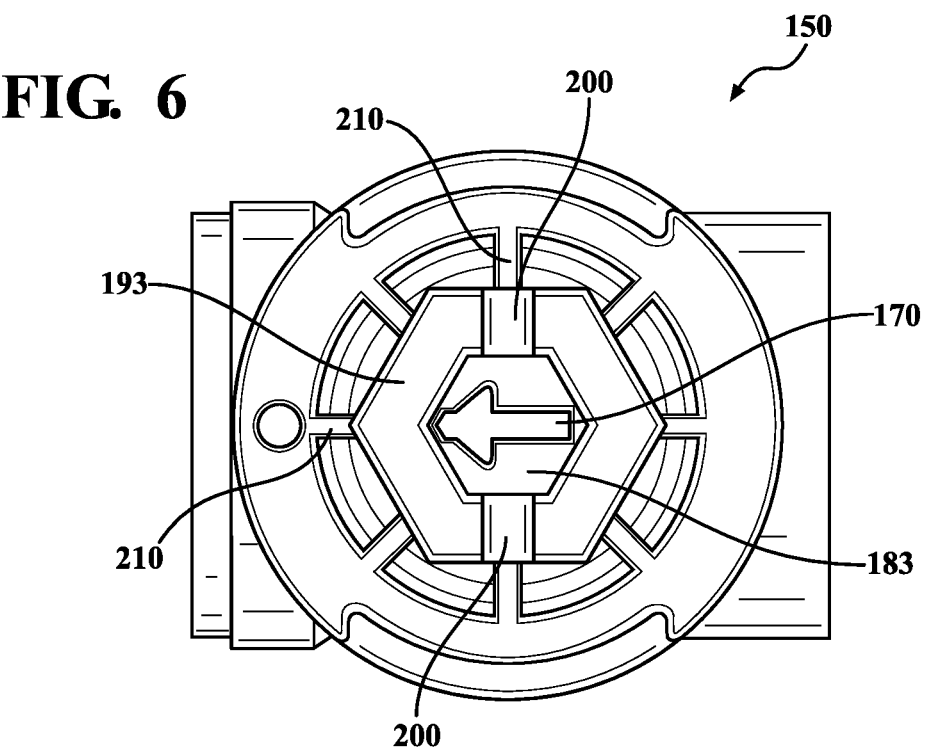
FIG. 6 is a front view of the service stop of FIG. 5, according to an exemplary embodiment.

Referring now to FIGS. 5-7, a service stop 150, according to an example embodiment, is shown in more detail, including a first tool interface 170, a second tool interface 180, a third tool interface 190, and a fourth tool interface 200, each configured to receive a first hand tool, a second hand tool, a third hand tool, and a fourth hand tool, respectively. According to other example embodiments, the service stop 150 may include more or fewer tool interfaces. For example, the service stop 150 may include at least one tool interface. The service stop 150 may include two tool interfaces, as another example. In still yet another example, the service stop 150 may include more than three tool interfaces.

In this example embodiment, the first tool interface 170 is designed to receive a flathead screwdriver so that the service stop 150 can be turned using a flathead screwdriver, which in turn will alter the fluid flow rate into the fluid inlet 110 by controlling the valve mechanism coupled to the service stop 150. According to other example embodiments, the first tool interface 170 may be designed to receive various other drivers. For example, the first tool interface 170 may be designed to receive a Phillips-head screwdriver. The first tool interface 170 may be designed to receive a Frearson-head screwdriver. In still yet other example embodiments, the first tool interface 170 may be designed to receive other drivers including, but not limited to, triangular drivers, square drivers, or hexagonal drivers. In this embodiment, the first tool interface 170 includes a recessed slot inside a hexagonal cavity on the face of the service stop 150, as is discussed below.

Further, in this example embodiment, the second tool interface 180 is designed to receive a hex wrench driver so that the service stop 150 can be turned using a hex wrench driver, which in turn will alter the fluid flow rate into the fluid inlet 110 by controlling the valve mechanism coupled to the service stop 150. According to other example embodiments, the second tool interface 180 may be designed to receive various other hand tools. For example, the second tool interface 180 may be designed to receive a square wrench driver. The second tool interface 180 may be designed to receive a torx wrench driver, as another example. In still yet other embodiments, the second tool interface 180 may be designed to receive hand tools including, but not limited to, a Phillips-head driver, a triangular driver, or a fluted socket driver. In this embodiment, the second tool interface 180 includes a hexagonal shaped cavity on the front face of the service stop 150. The hexagonal shaped cavity includes a bottom surface 183. The bottom surface 183 of the hexagonal shaped cavity includes the slotted recess for the first tool interface 170, which is located inside the hexagonal shaped cavity. Further, the hexagonal shaped cavity includes a plurality of inside walls 185, such that when a hex wrench driver is inserted into the hexagonal shaped cavity, and torque is applied to the hex wrench driver, the hex wrench driver will engage with the plurality of inside walls 185 of the hexagonal shaped cavity.

Additionally, in this example embodiment, the third tool interface 190 is designed to receive a nut driver, wrench, or the like, so that the service stop 150 can be turned using a nut driver, wrench, or the like, which in turn will alter the fluid flow rate into the fluid inlet 110 by controlling the valve mechanism coupled to the service stop 150. In this embodiment, the third tool interface 190 includes a hexagonal shaped extrusion on the face of the service stop 150. According to other example embodiments, the third tool interface 190 may be include various other shaped extrusions on the face of the service stop 150. For example, the third tool interface 190 may be include a square shaped extrusion. The third tool interface 190 may include a triangular shaped extrusion, as another example. In still yet other embodiments, the third tool interface 190 may be include various other shaped extrusions including, but not limited to, a circular, pentagonal, or octagonal.

The third tool interface 190 includes a plurality of outside walls 195 located on the outside of the hexagonal shaped extrusion. When a nut driver is applied to third tool interface 190 and a torque is applied to the nut driver, for example, the nut driver will engage with the outside walls 195. Further, the face of the service stop 150 includes an inter-peripheral body 193. The inter-peripheral body 193 is defined on the outside by the outside walls 195 and on the inside by the inside walls 185. In this embodiment, the hexagonal shaped cavity of the second tool interface 180 is centered within the inter-peripheral body 193. Further, in this example embodiment, each inside wall 185 will be parallel to an outside wall 195.

Additionally, in this example embodiment, the fourth tool interface 200 is designed to receive a flathead screwdriver so that the service stop 150 can be turned using a flathead screwdriver, which in turn will alter the fluid flow rate into the fluid inlet 110 by controlling the valve mechanism coupled to the service stop 150. In this embodiment, the fourth tool interface 200 includes two recessed slots on the front of the inter-peripheral body 193. As shown in FIG. 6, the first recessed slot is positioned opposite of the second recessed slot on the front of the inter-peripheral body 193. In this embodiment, the recessed slots of the fourth tool interface 200 have a lesser depth than the hexagonal shaped cavity of the second tool interface 180.

Further, in this example embodiment, the service stop 150 includes a plurality of ribs 210. Ribs 210 may extend radially outward from outside wall 195 and connect to an inner perimeter wall of the cavity within which the hexagonal shaped extrusion is contained. In some embodiments, ribs 210 extend radially from an axis of rotation of the service stop 150 (e.g., are located along radial lines extending from the axis of rotation). Ribs 210 may extend from the inner perimeter wall and converge at the axis of rotation, or may extend partially from the inner perimeter wall and connect to the hexagonal shaped extrusion before reaching the axis of rotation. Ribs 210 may help transfer torque from any of the tool interfaces 170, 180, 190, and/or 200 to the perimeter of the valve mechanism to facilitate turning and reduce shear force applied to the base of the hexagonal shaped extrusion. A user can also turn the service stop 150 using a pair of pliers. A pair of pliers, whether it be needle nose, adjustable, slip joint, or lineman style, can be used to grip the ribs 210 so that a user may turn the service stop 150. In this embodiment, the service stop 150 includes eight ribs 210, attached to the outside walls 195, evenly spaced around the hexagonal shaped extrusion of the third tool interface 190. In other example embodiments, the service stop 150 may include more or fewer ribs 210. For example, the service stop 150 may include 7 ribs 210. The service stop 150 may include 9 ribs 210, as another example.

Further, in this example embodiment, pliers can also be used to grip the third tool interface 190 to turn the service stop 150. Since the third tool interface 190 in this example embodiment includes a hexagonal shaped extrusion, it will be much easier to grip with a pair of pliers than a circular extrusion.

While this example embodiment is designed to receive the tools listed above, it should be understood that the service stop 150 can be designed to receive a plurality of tools including any type of hand tool, including, but not limited to any type of flathead screwdrivers, Phillips-head screwdrivers, an Allen wrench screwdriver, a hexagonal drive, a torx drive, a Robertson drive, a tri-wing screwdriver, an Allen security driver, a torx security driver, a Pozidriv, a clutch drive, a spanner, a Schrader drive, a nut driver, a hex wrench, a node security driver, any combination of the listed driver interfaces, and any other type of driver interface that may be known by one of ordinary skill in the art. Further, while this example embodiment shows four tool interfaces on the service stop 150, a service stop 150 may include two, three, five, six, seven, or more tool interfaces.

Having more than one tool interface on the service stop 150 is particularly advantageous for several reasons. For example, if there is only tool interface on the service stop 150, such as a flathead slot designed to receive a flathead screwdriver, and the tool interface is stripped or otherwise damaged, it may be difficult or impossible to turn the service stop 150, which in turn would make it difficult or impossible to close the valve mechanism that is capable of stopping the flow of fluid into the fluid inlet 110. Additionally, if the only tool interface on the service stop 150, such as a nut drive interface designed to receive a nut driver, becomes filled with any type of debris or building material, such as plaster, the tool interface may not be capable of receiving a nut driver, making it difficult or impossible to turn the service stop 150, which is turn would make it difficult or impossible to close the valve mechanism that is capable of stopping the flow of fluid into the fluid inlet 110. Additionally, having more than one tool interface on the service stop 150 gives the user, such as a plumber, a better chance of having the tool needed to turn the service stop 150. If there is only one tool interface, such as a flathead slot configured to receive a flathead screwdriver, and the plumber does not have a flathead screwdriver, or does not have the properly sized flathead screwdriver, then the plumber will not be able to turn the service stop 150. By increasing the number of tool interfaces, the chances that the plumber is carrying a tool that is capable of turning the service stop 150 also increases.

It should be noted that the term "hand tool" does not limit the type of tool that can be used to turn the service stop 150 to tools that are exclusively powered by a human operator. For example, a power drill may be adapted to drive a nut driver, a hex head, a Philip head, a flathead screwdriver, and many other types of tools. Therefore, the term "hand tool" should be construed to include not only hand driven tools, but also power tools adapted to drivers commonly found in hand tools.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present application.

What is claimed is:

1. A valve assembly comprising:
   a first tool interface comprising a bottom surface and one or more walls extending from the bottom surface to a top surface in a first direction, the first tool interface configured to receive a nut driver around the one or more walls and transfer a first torque from the nut driver to rotate a service stop; and a second tool interface comprising a slot recessed into the top surface of the one or more walls in a second direction opposite the first direction, the second tool interface configured to receive a screwdriver and transfer a second torque from the screwdriver to rotate the service stop.

2. The valve assembly of claim 1, further comprising a third tool interface configured to receive a third hand tool and transfer a third torque from the third hand tool to rotate the service stop, wherein the third hand tool is different from the nut driver and the screwdriver.

3. The valve assembly of claim 2, further comprising a fourth tool interface configured to receive a fourth hand tool and transfer a fourth torque from the fourth hand tool to rotate the service stop, wherein the fourth hand tool is different from the nut driver, the screwdriver, and the third hand tool.

4. The valve assembly of claim 1, wherein rotating the service stop inhibits a flow of fluid through an outlet or an inlet of the valve assembly.

5. The valve assembly of claim 1, wherein the second tool interface is at least partially contained within the first tool interface.

6. The valve assembly of claim 1, wherein:
the service stop comprises a position indicator configured to indicate a rotational position of the service stop relative to an inlet or an outlet of the valve assembly.

7. The valve assembly of claim 1, wherein:
the one or more walls of the first tool interface define an inter-peripheral body configured to at least partially fit within the nut driver.

8. A valve assembly comprising:
a first tool interface comprising a bottom surface and one or more walls extending from the bottom surface to a top surface in a first direction, the first tool interface configured to receive a hex wrench within a perimeter of the one or more walls and transfer a first torque from the hex wrench to rotate a service stop; and
a second tool interface comprising a slot recessed into the top surface of the one or more walls in a second direction opposite the first direction, the second tool interface configured to receive a screwdriver and transfer a second torque from the screwdriver to rotate the service stop.

9. The valve assembly of claim 8, further comprising a third tool interface configured to receive a third hand tool to transfer a third torque from the third hand tool to rotate the service stop, wherein the third hand tool is different from the hex wrench and the screwdriver.

10. The valve assembly of claim 9, further comprising a fourth tool interface configured to receive a fourth hand tool to transfer a fourth torque from the fourth hand tool to rotate the service stop, wherein the fourth hand tool is different from the hex wrench, the screwdriver, and the third hand tool.

11. The valve assembly of claim 8, wherein rotating the service stop inhibits a flow of fluid through an outlet or an inlet of the valve assembly.

12. The valve assembly of claim 8, wherein the second tool interface is at least partially contained within the first tool interface.

13. The valve assembly of claim 8, wherein:
the service stop comprises a position indicator configured to indicate a rotational position of the service stop relative to an inlet or an outlet of the valve assembly.

14. The valve assembly of claim 8, wherein:
the one or more walls of the first tool interface define an inter-peripheral body configured to at least partially receive the hex wrench.

15. A valve assembly comprising:
at least three tool interfaces configured to receive at least three different hand tools and transfer torque from the at least three different hand tools to the valve assembly;
wherein each of the at least three different hand tools are configured to operate the valve assembly between an open position and closed position;
wherein a first tool interface of the at least three tool interfaces comprises a plurality of walls defining an outer peripheral surface of an inter-peripheral body; and
wherein a second tool interface of the at least three tool interfaces comprises a rib that extends laterally outward from the outer peripheral surface toward a portion of a valve housing, the rib configured to be gripped by pliers and transfer a torque from the pliers via the rib to rotate the second tool interface relative to the valve housing.

16. The valve assembly of claim 15, wherein the plurality of walls include outside walls defining an outer perimeter of the inter-peripheral body of the valve assembly, the inter-peripheral body configured to at least partially fit within a nut driver and transfer a torque from the nut driver via the plurality of outside walls.

17. The valve assembly of claim 15, wherein the plurality of walls include inside walls defining an inner perimeter of the inter-peripheral body of the valve assembly, the inter-peripheral body configured to receive a hex wrench and transfer a torque from the hex wrench via the plurality of inside walls.

18. The valve assembly of claim 15, wherein a third tool interface of the at least three tool interfaces comprises a slot recessed into a second surface of the valve assembly, the slot configured to receive a flathead screwdriver and transfer a torque from the flathead screwdriver via the slot.

19. The valve assembly of claim 15, wherein a third tool interface of the at least three tool interfaces is contained at least partially within the first tool interface.

20. The valve assembly of claim 15, wherein:
the plurality of walls extend from a second surface in a first direction; and
a third tool interface of the at least three tool interfaces comprises a slot recessed into the second surface in a second direction that opposes the first direction.

\* \* \* \* \*